US006987850B1

(12) United States Patent
Watson

(10) Patent No.: US 6,987,850 B1
(45) Date of Patent: Jan. 17, 2006

(54) COMMUNICATION SYSTEM FOR TELECOMMUNICATION RELAY SERVICES

(75) Inventor: Thomas Michael Watson, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 147 days.

(21) Appl. No.: 10/790,891

(22) Filed: Mar. 2, 2004

(51) Int. Cl.
*H04M 11/00* (2006.01)

(52) U.S. Cl. ............................ 379/265.02; 379/265.13

(58) Field of Classification Search ..................... None
See application file for complete search history.

(56) References Cited

U.S. PATENT DOCUMENTS 6,570,963 B1 5/2003 Watson et al.
6,683,937 B1 1/2004 Watson et al.
6,724,886 B1 4/2004 Watson

*Primary Examiner*—Creighton Smith

(57) ABSTRACT

A communication system comprising a first interface configured to receive first call signaling for an incoming call from a calling party wherein the first call signaling indicates first information for the incoming call and receive a first type of communications for the incoming call from the calling party and transfer the communications to an agent, a processing system configured to process the first call signaling to determine the agent for the incoming call, and a second interface configured to transfer second call signaling for an outgoing call to a called party wherein the second call signaling indicates the first information for the incoming call and transfer a second type of communications for the outgoing call from the agent to the called party wherein the agent translated the first type of communications to the second type of communications.

34 Claims, 11 Drawing Sheets

CALLER DIALS COMM SYSTEM
210

COMM SYSTEM RECEIVES CALL SIGNALING MESSAGE FOR THE CALL
220

COMM SYSTEM RETRIEVES CALLER PREFERRED ROUTING INFORMATION
230

COMM SYSTEM SELECTS AGENT BASED ON CALLER PREFERRED ROUTING INFORMATION
240

COMM SYSTEM CONNECTS CALLER TO AGENT STATION
250

AGENT PLACES OUTGOING CALL FOR CALLER
260

COMM SYSTEM TRANSFERS SIGNALING MESSAGE FOR OUTGOING CALL TO CALLED PARTY
270 bit

| byte | 8 | 7 | 6 | 5 | 4 | 3 | 2 | 1 |
|---|---|---|---|---|---|---|---|---|
| 1 | Length of User-User contents (n) | | | | | | | |
| 2 | Protocol Discriminator | | | | | | | |
| 3 | Mask with 0's | | | | | | | Privacy Bit |
| 4-19 | Charge Number digits | | | | | | | |
| 20 | OLI | | | | | | | |
| 21-n | User to User Information bytes from ISUP message if present in ISUP message | | | | | | | |

FIG. 9

| | 8 | 7 | 6 | 5 | 4 | 3 | 2 | 1 |
|---|---|---|---|---|---|---|---|---|
| 1 | Odd/Even | Nature of Address Indicator | | | | | | |
| 2 | Spare | Numbering Plan | | | Caller ID Presentation 00=allowed, 01=not allowed | | spare | |
| 3 | Not Used | | | | Calling Number Digit 0 | | | |
| 4 | Not Used | | | | Calling Number Digit 1 | | | |
| 5 | Not Used | | | | Calling Number Digit 2 | | | |
| 6 | Not Used | | | | Calling Number Digit 3 | | | |
| 7 | Not Used | | | | Calling Number Digit 4 | | | |
| 8 | Not Used | | | | Calling Number Digit 5 | | | |
| 9 | Not Used | | | | Calling Number Digit 6 | | | |
| 10 | Not Used | | | | Calling Number Digit 7 | | | |
| 11 | Not Used | | | | Calling Number Digit 8 | | | |
| 12 | Not Used | | | | Calling Number Digit 9 | | | |

FIG. 10

COMMUNICATION SYSTEM FOR TELECOMMUNICATION RELAY SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunication relay services (TRS), and specifically, to a communication system capable of providing advanced call signaling information for TRS calls.

2. Description of the Prior Art

Various federal and state laws and regulations require telecommunication carriers to provide services by which hearing and speech impaired people can communicate with other people. In response, the telecommunication carriers have developed telecom relay services (TRS) to translate between hearing or speech impaired callers and called parties. TRS systems in the prior art typically involve a hearing impaired person dialing a toll free number to connect to the TRS call center using a TDD/TTY device. An agent at the TRS call center answers the call and prompts the hearing impaired caller for a phone number to out-dial. The agent then out-dials the phone number and connects the hearing impaired caller to a called party at the phone number. The agent translates text to speech or speech to text between the called party and the hearing impaired caller.

Current TRS systems include automatic call distributors (ACD) that route the incoming calls from the hearing and speech impaired individuals to call agents at TRS call centers. The Rockwell Galaxy is an example of an ACD in the prior art. The Federal Communications Commission (FCC) has mandated that TRS systems support new services such as SS7 for advanced call information. Unfortunately, providing advanced call signaling to a called party is beyond the capabilities of the prior art. Current systems are not able to provide advanced call signaling information for the out going calls placed by the call agents. For instance, when an agent outdials a phone number on behalf of a hearing impaired caller, the called party receives a Caller ID associated with the TRS call center rather than a Caller ID for the hearing impaired customer. Thus, current TRS solutions fall short of supporting the newly required and anticipated services.

It is desirable in the art of telecommunications to have a TRS communication system capable of providing advanced call signaling information for TRS calls.

SUMMARY OF THE INVENTION

The present invention advances the art with a TRS communication system capable of providing advanced call signaling information for TRS calls. Advantageously, the present TRS communication system is configured so that call signaling for incoming TRS calls can be utilized to provide advanced call signaling information for outgoing TRS calls.

An embodiment of the invention includes a communication system comprising a first interface configured to receive first call signaling for an incoming call from a calling party wherein the first call signaling indicates first information for the incoming call and receive a first type of communications for the incoming call from the calling party and transfer the communications to an agent. The invention also includes a processing system configured to process the first call signaling to determine the agent for the incoming call. The invention also includes a second interface configured to transfer second call signaling for an outgoing call to a called party wherein the second call signaling indicates the first information for the incoming call and transfer a second type of communications for the outgoing call from the agent to the called party wherein the agent translated the first type of communications to the second type of communications.

BRIEF DESCRIPTION OF THE DRAWINGS

The same reference number represents the same element on all drawings.

FIG. 9 illustrates a format of a user—user information element in an embodiment of the invention.

FIG. 10 illustrates a format of a calling party number information element in an embodiment of the invention.

DETAILED DESCRIPTION OF THE PREFERRED EMBODIMENT

FIGS. 1–11 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
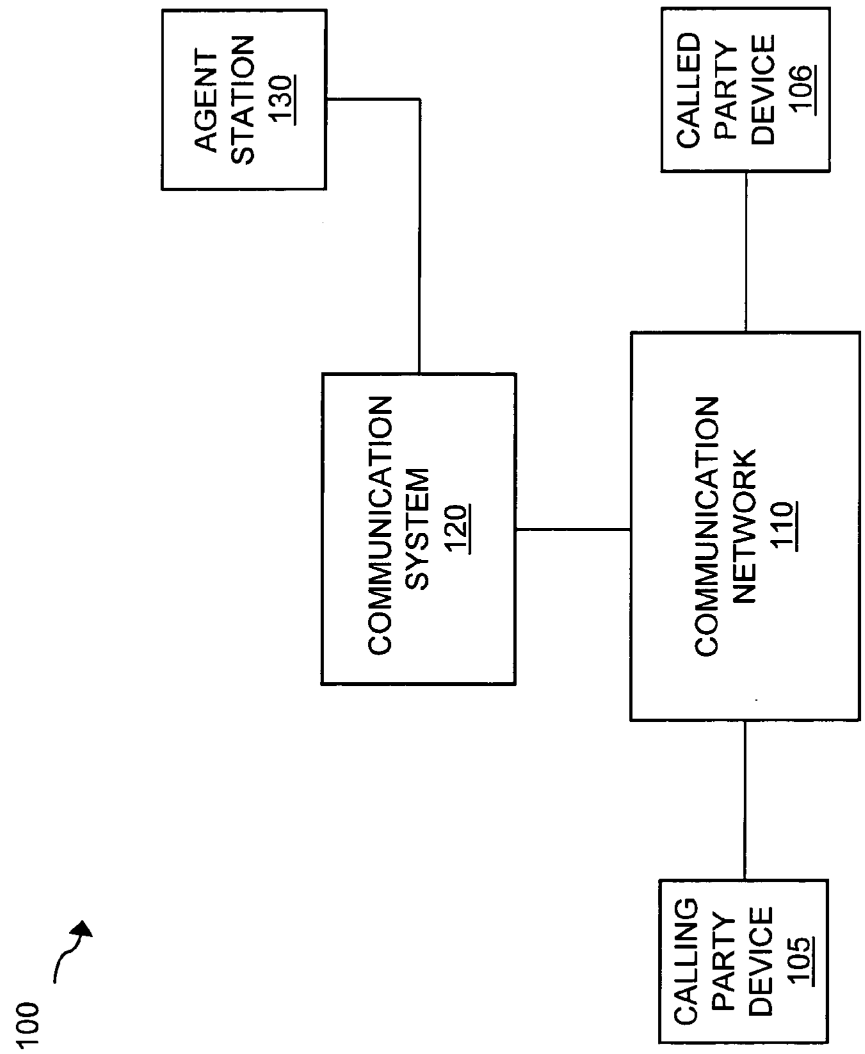
FIG. 1 illustrates a TRS system in an embodiment of the invention.
Figure 2:
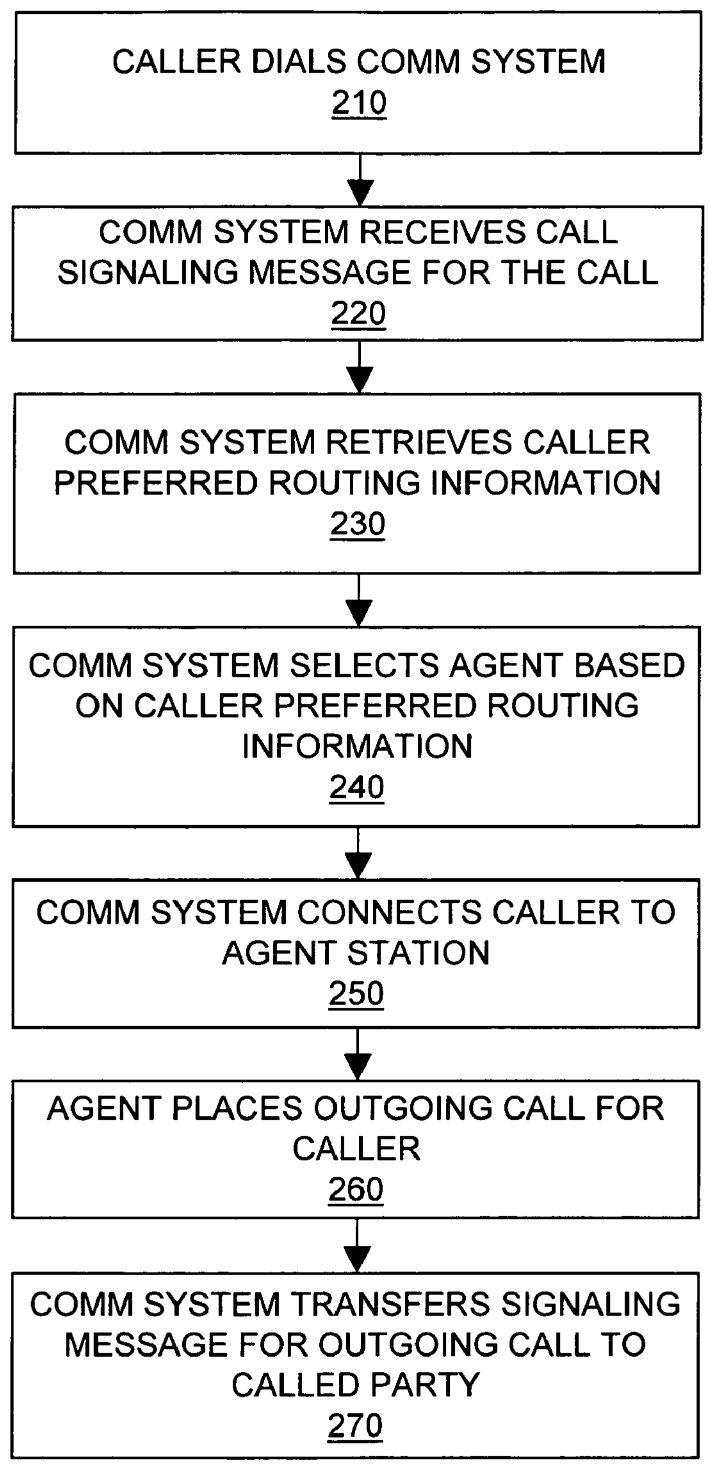
FIG. 2 illustrates the operation of a TRS system in an embodiment of the invention.

First Embodiment Configuration and Operation—FIGS. 1–2

FIG. 1 illustrates telecommunication relay services (TRS) system 100 in an embodiment of the invention. TRS system 100 comprises calling party device 105, routing system 110, communication system 120, agent station 130, and called party device 106. Calling party device 105 and called party device 106 are connected to routing system 110 by communication links well known to those in the art. Routing system 110 is connected to communications system 120. Communication system 120 is connected to agent station 130. TRS system 100 allows a calling party using calling party device 105 to place a call to agent station 130 through communications system 120. An agent at agent station 130 can then connect the calling party to a called party at called party device 106. When the agent out-dials the called party, advanced signaling information such as Caller ID is provided to the called party identifying the calling party.

Calling party and called party devices 105 and 106 are any devices capable of transferring communications to routing system 110 and receiving communications from routing system 110. For example, calling party and called party devices 105 and 106 could be wireline or wireless communication devices such as standard telephone, a wireless phone, a personal digital assistant (PDA), or a computer. Calling party and called party devices 105 and 106 could also be TTD/TTY devices that transmit communications in a text format such as Baudot.

Routing system 110 is a system capable of routing communications for calls to and from calling party device 105, called party device 106, communication system 120, and agent station 130. While FIG. 1 depicts agent station 130 as connected to communication system 120, agent station 130 could also be connected to routing system 110. Routing system 110 could comprise a switched network such as the public switched telephone network (PSTN). Routing system 110 could also comprise an Internet Protocol (IP) based network such as the Internet. Routing system 110 could include elements of the PSTN as well as IP elements. Routing system 110 could support asynchronous communications as wells as time division multiplexed (TDM) communications. Voice-over IP (VoIP) communications are an example of asynchronous communications. Routing system 110 is also capable of handling call signaling for calls to and from calling party device 105, called party device 106, communication system 120, and agent station 130. The call signaling could be signaling system seven (SS7) signaling, Integrated Services Digital Network (ISDN) signaling, or IP messages containing signaling information.

Communication system 120 is a system capable of receiving incoming calls from calling party device 105 and connecting outgoing calls to called party device 106. Communication system 120 is also capable of connecting incoming and outgoing calls to and from agent station 130, thereby bridging communications between calling party device 105 and called party device 106. Communication system 120 is also capable of processing call signaling for incoming and outgoing calls. Agent station 130 provides an interface for an agent to translate communications between a calling party and a called party. For example, agent station 130 displays text sent from a calling party. An agent can then read the text to a called party.

FIG. 2 illustrates the operation of TRS system 100 in an embodiment of the invention. In operation, a speech or hearing impaired caller wishes to places a call to a third party such as a friend or business associate. The speech or hearing impaired calling party places a call for TRS to routing system 110 (Step 210). Routing system 110 receives call signaling for the call including call information for the call. Routing system 110 processes the information and routes the call to communication system 110.

Communication system 120 receives the call signaling for the call from routing system 110 (Step 220) and processes the information to determine routing preferences for the calling party. Communication system 120 retrieves the routing preferences for the calling party (Step 230). The routing preferences indicate the preferred answer type for the calling party, as well as other preferences such as language. Communication system 120 selects an appropriate agent for the calling party based on the preferences for the calling party (Step 240) and connects the calling party to the selected agent at agent station 130 (Step 250). The agent prompts the calling party for a number to out-dial on behalf of the calling party. Upon receiving the number, the agent places an outgoing call from agent station 130 to called party device 106 for the calling party (Step 260). Communication system 120 transfers call signaling for the outgoing call to the called party device 106 (Step 270). The call signaling for the outgoing call includes some of the information from the call signaling for the incoming call including a calling party number for the calling party. After call setup is complete, the agent at agent station 130 translates communications between the calling party and the called party.

Figure 3:
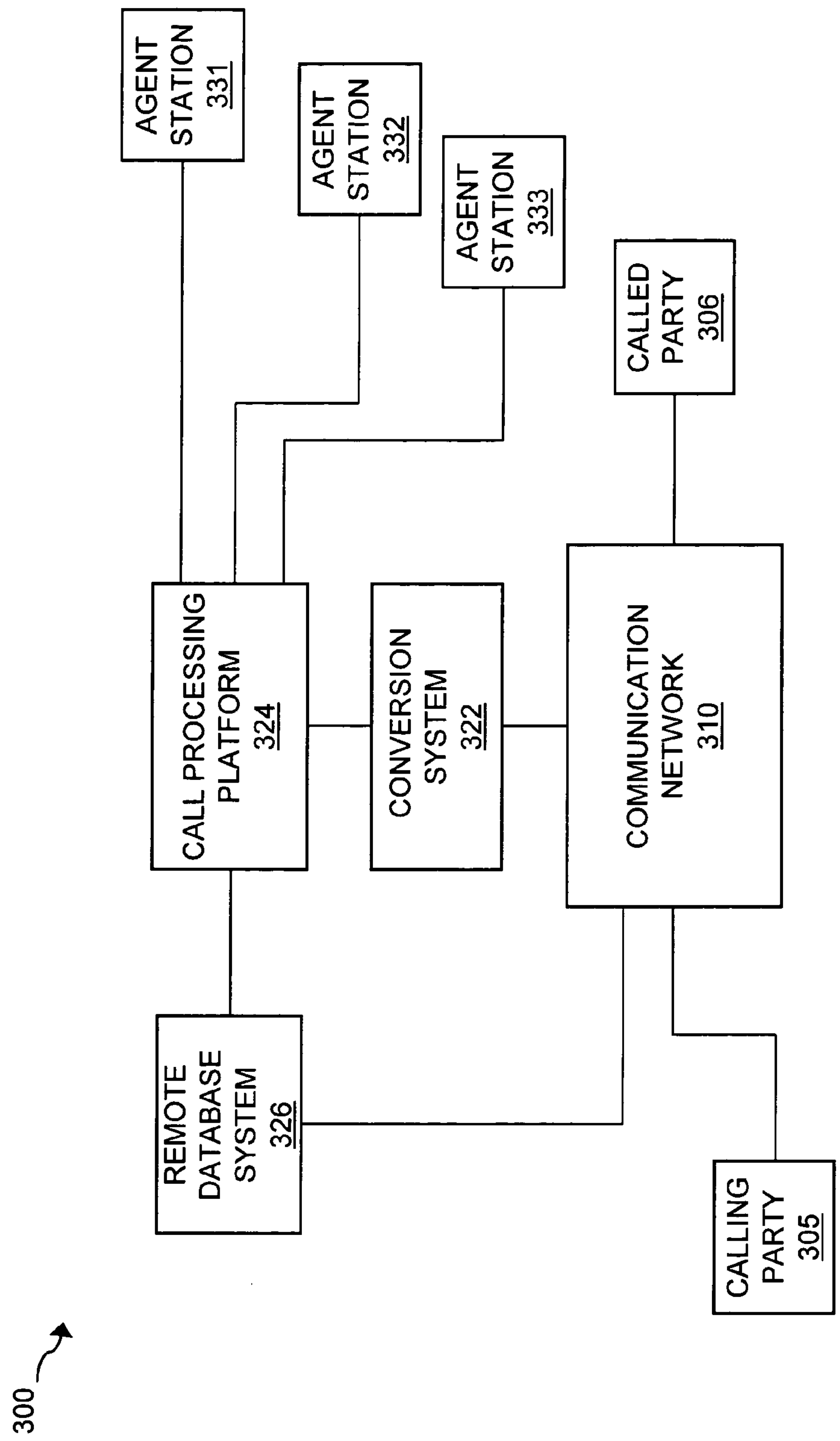
FIG. 3 illustrates a TRS system in an embodiment of the invention.
Figure 4:
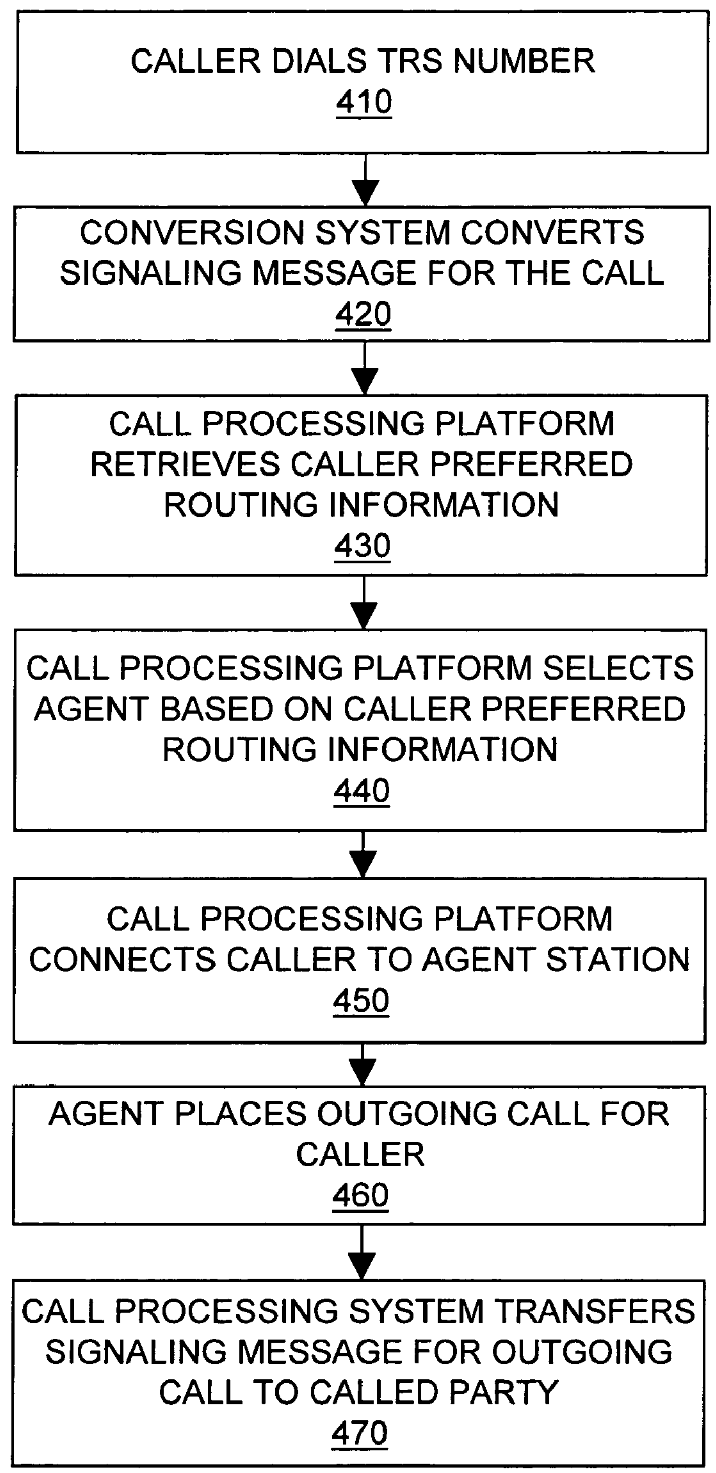
FIG. 4 illustrates the operation of a TRS system in an embodiment of the invention.
Figure 5:
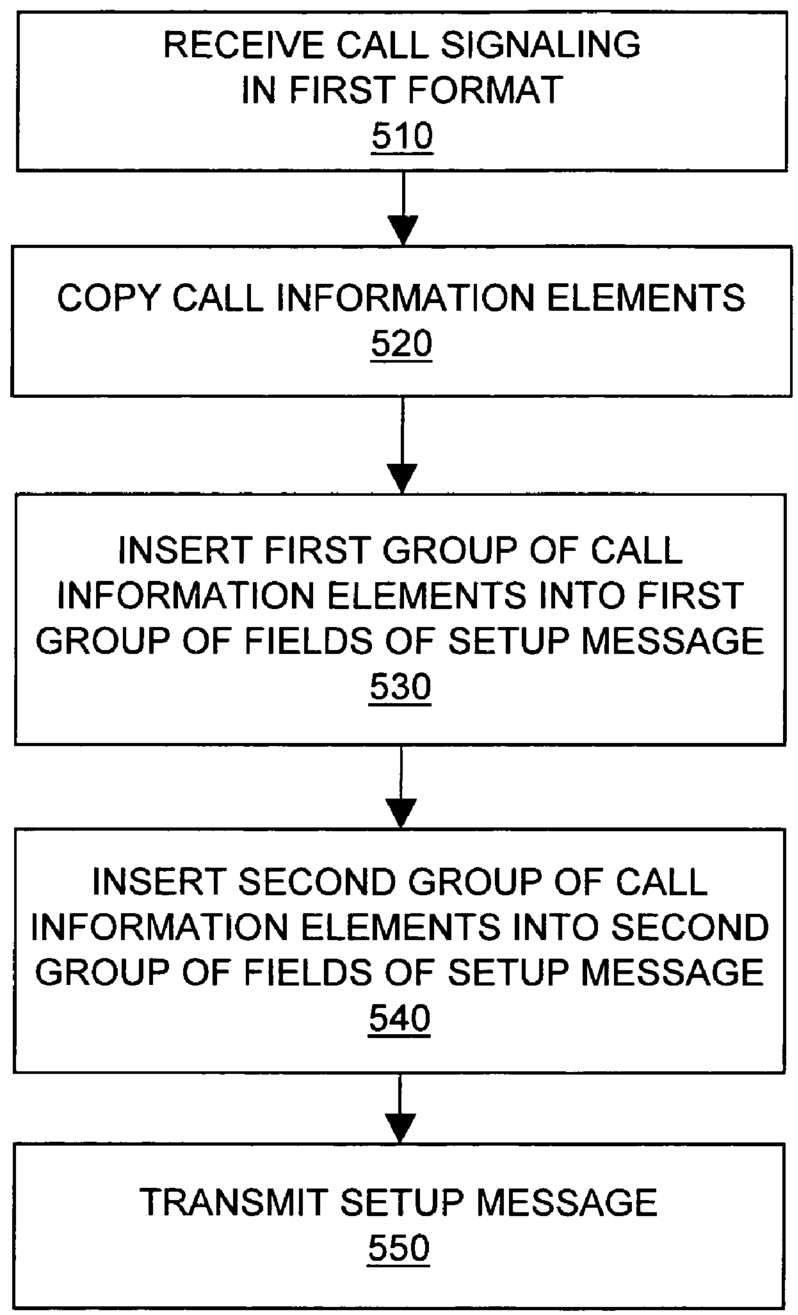
FIG. 5 illustrates the operation of a conversion system in an embodiment of the invention.

Second Embodiment Configuration and Operation—FIGS. 3–5

FIG. 3 illustrates TRS system 300 in an embodiment of the invention. TRS system 300 includes calling party device 305, routing system 310, called party device 306, conversion system 322, call processing platform 324, remote database 326, and agent stations 331, 332, and 333. Routing system 310 is connected to calling party device 305, called party device 306, remote database system 326, and conversion system 322. Conversion system 322 is connected to call processing platform 324. Call processing platform 324 is connected to agent stations 331, 332, and 333.

Routing system 310 could be any routing system capable of routing communications and signaling for calls as is well known in the art. Routing system could comprise a packet based network such as a VoIP network. Routing system could also comprise the PSTN and include PSTN elements such as a switch and a signal transfer point (STP). Routing system 310 is capable of transferring queries to remote database system 326 and receiving responses from remote database system 326. In an embodiment of the invention, routing system 310 could include at DMS-250 switch coupled to an STP.

Remote database system 326 is any system capable of receiving queries from routing system 310 and call processing platform 324 and transferring responses to routing system 310 and call processing platform 324. In a preferred embodiment of the invention, remote database system 326 is a service control point (SCP). Remote database system 326 could also be an SCP coupled with a remote processor (RP). Remote database system 326 is capable of receiving queries and transferring responses in the signaling system seven (SS7) signaling protocol for advanced intelligent networks. Remote database system 326 is also capable of receiving queries and transferring responses in a packet based format such as TCP/IP.

Conversion system 322 is any system capable of receiving call signaling for a call in a first format and converting the call signaling to a second format. For example, the first format could comprise SS7 signaling, and the second format could comprise ISDN signaling. In a preferred embodiment of the invention, conversion system 322 is a Pulse-Encore SP230 conversion system. Call processing platform 324 is any system capable of receiving call signaling and converting the call signaling to packet based formats such as IP. Call processing platform 324 is also capable of processing the call signaling. Additionally, call processing platform 324 is any system capable of transferring queries to remote database system 326 and receiving responses from remote database system 326. Call processing platform 324 is also capable of connecting calls to agent stations 331, 332, and 333.

FIG. 4 illustrates the operation of TRS system 300 in an embodiment of the invention. To begin, a speech or hearing impaired caller wishes to utilize TRS services. The caller dials a toll-free 800 number to access the TRS services (Step 410). Routing system 310 receives call signaling for the call in a first format including the dialed number and a calling party number. For example, routing system 310 could receive an SS7 Initial Address Message for the call. Routing system 310 transmits a query to remote database system 326 including the dialed number. Remote database system 326 processes the dialed number to determine a destination for the call. Remote database system 326 transmits a response to routing system 310 indicating conversion system 322 as the destination for the call.

Routing system 310 then transfers the call signaling to conversion system 322. Conversion system 322 converts the signaling from the first format to a second format (Step 420) and transfers the call signaling to call processing platform 324. Call processing platform 324 retrieves caller preferred routing information for the call by transmitting a query to remote database system 326 (Step 430). The query indicates the dialed number of the call and the calling party number. Remote database system 326 processes the dialed number to determine default caller preferred routing information. Remote database system 326 then processes the calling party number to determine specific caller preferred routing information. If the caller specific preferred routing information is different than the default information, remote database system 326 transmits a response to call processing platform 324 indicating the caller specific preferred routing information. If no specific routing information exists based on the calling party number, remote database system 326 transfers a response to call processing platform 324 indicating the default preferred routing information.

Based on the preferred routing information returned by remote database system 326, call processing platform 324 selects an agent to handle the TRS call (Step 440). For example, the preferred routing information could indicate an answer type for the call. An answer type directs the agent to answer the call in one of several ways: using voice communications, text communications, or video communications. Other types of answers are possible, although they are not described for the sake of brevity. The preferred routing information could also indicate what language the agent should use. For example, the calling party may prefer to communicate in Spanish rather than English. Thus, the agent would be required to understand the Spanish language. Call processing platform 324 processes the preferred routing information to determine an appropriate agent at one of agent stations 331, 332, and 333 to handle the call.

Upon determining the appropriate agent, call processing platform connects the calling party to the selected agent station 331, 332, 333. In this example, we will assume that the agent at agent station 331 was selected and that the call was connected to agent station 331. The call connection could be routed through conversion system 322 and call processing platform 324 to agent station 331. Alternatively, the call could be connected through other network elements not shown. For example, the call could be connected from a switch within routing system 310 to a tandem switch coupled to call processing platform 324, bypassing conversion system 322. In this manner, call signaling for the call would traverse conversion system 322, and communications for the call would travel through the tandem switch.

Upon connecting the calling party to the agent at agent station 331, the agent prompts the calling party to choose a service. For example, the calling party could choose to access information services such as an operator. The calling party could also choose to speak to a customer service representative. The calling party could also choose to make an outgoing call to a third party. The agent communicates with the calling party in accordance with the answer type returned with the caller preferred routing information. For example, the agent could receive communications from the calling party in a text format. Assuming the calling party decides to make an outgoing call, the agent prompts the calling party for a destination number. The calling party provides the agent with a phone number and the agent places the outgoing call on behalf of the calling party (Step 460).

When the agent places the outgoing call, call processing system 324 receives the phone number from agent station 331. Call processing system 324 then transfers call signaling for the outgoing call to the tandem switch connected to routing system 310 (Step 470). The call signaling for the outgoing call indicates calling party information for the call such as the calling party number. In this manner, the called party receives advanced call signaling information such as Caller ID for the call. The called party is then made aware of the identity of the calling party.

FIG. 5 illustrates the operation of conversion system 322 in an embodiment of the invention. Conversion system 322 receives a call signaling message for the incoming call in a first format into a first interface wherein the call signaling message includes a plurality of call information elements (Step 510). Conversion system 322 copies the plurality of call information elements from the call signaling message (Step 520) and inserts a first group of the call information elements into a first group of a plurality of fields of a setup message (Step 530). Next, conversion system 322 inserts a second group of the call information elements into a second group of the plurality of fields of the setup message (Step 540). Message conversion system 322 then transmits the setup message from a second interface (Step 550) to call processing platform 324.

Third Embodiment Configuration and Operation—FIGS. 6–10

Figure 6:
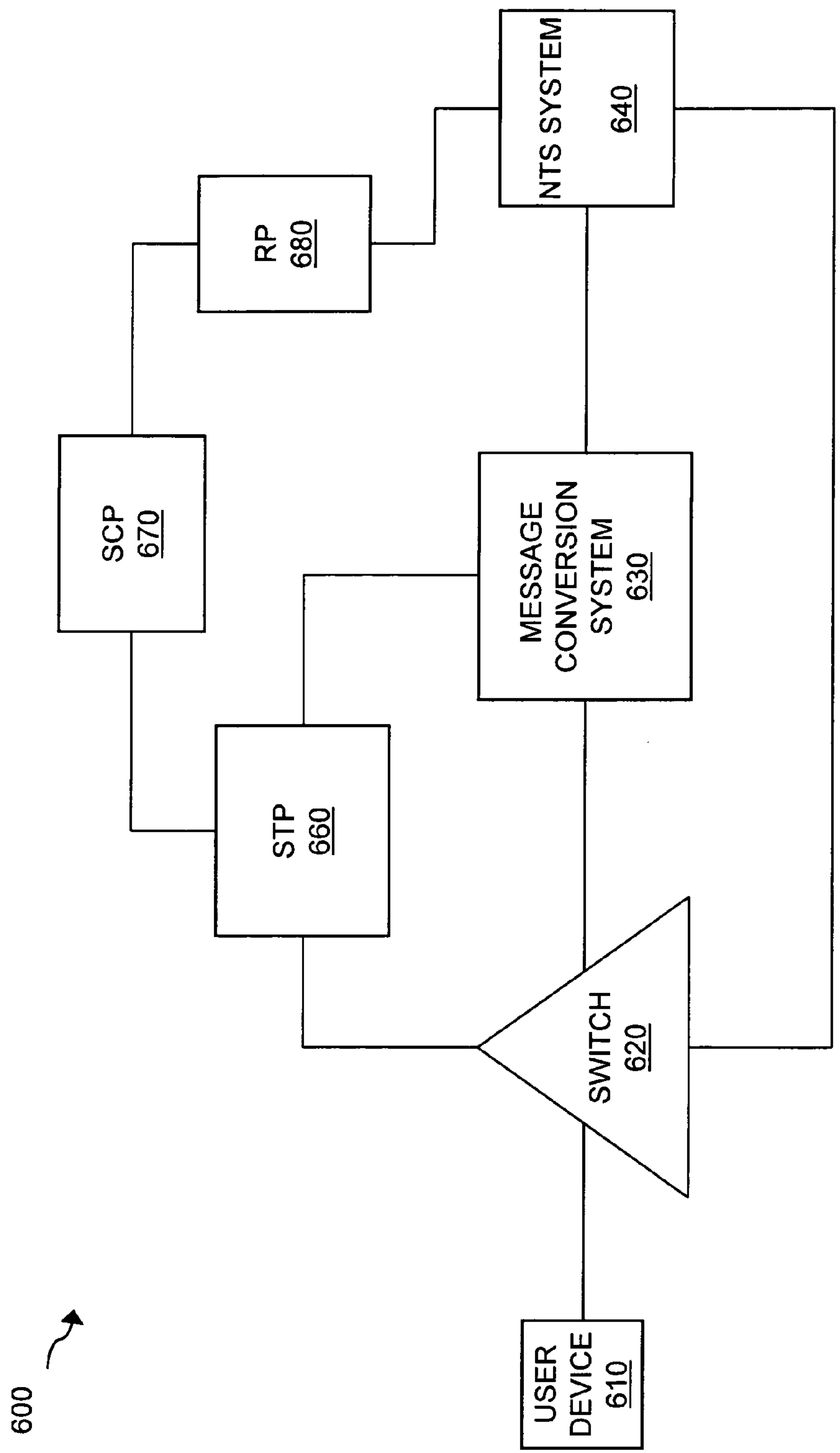
FIG. 6 illustrates a TRS system in an embodiment of the invention.

FIG. 6 illustrates telecommunications relay service (TRS) system 600 in an embodiment of the invention. TRS system 600 includes user device 610, switch 620, message conversion system 630, networked telephony service (NTS) system 640, signal transfer point (STP) 660, service control point (SCP) 670, and remote processor (RP) 680. Switch 620 comprises a DSM-250 switch. Message conversion system 630 comprises a Pulse-Encore SP230 conversion system. Switch 620 is connected to message conversion system 630 and NTS system 640. RP 680 is connected to NTS system 640 and SCP 670. STP 660 is connected to message conversion system 630 and switch 620.

Switch 620 connects with message conversion system 630 over conventional time division multiplexed (TDM) circuits such as a T-1 circuit. System 630 then connects to NTS system 640 over conventional TDM circuits using ISDN connections. STP 660 interchanges signaling between switch 620, SCP 670, and message conversion system 630 by signaling system 7 (SS7) signaling. NTS system 640 connects directly to switch 620 over conventional TDM circuits using Integrated Services Digital Network (ISDN) connections, Ultra Watts, or a virtual private network (VPN).

Figure 7:
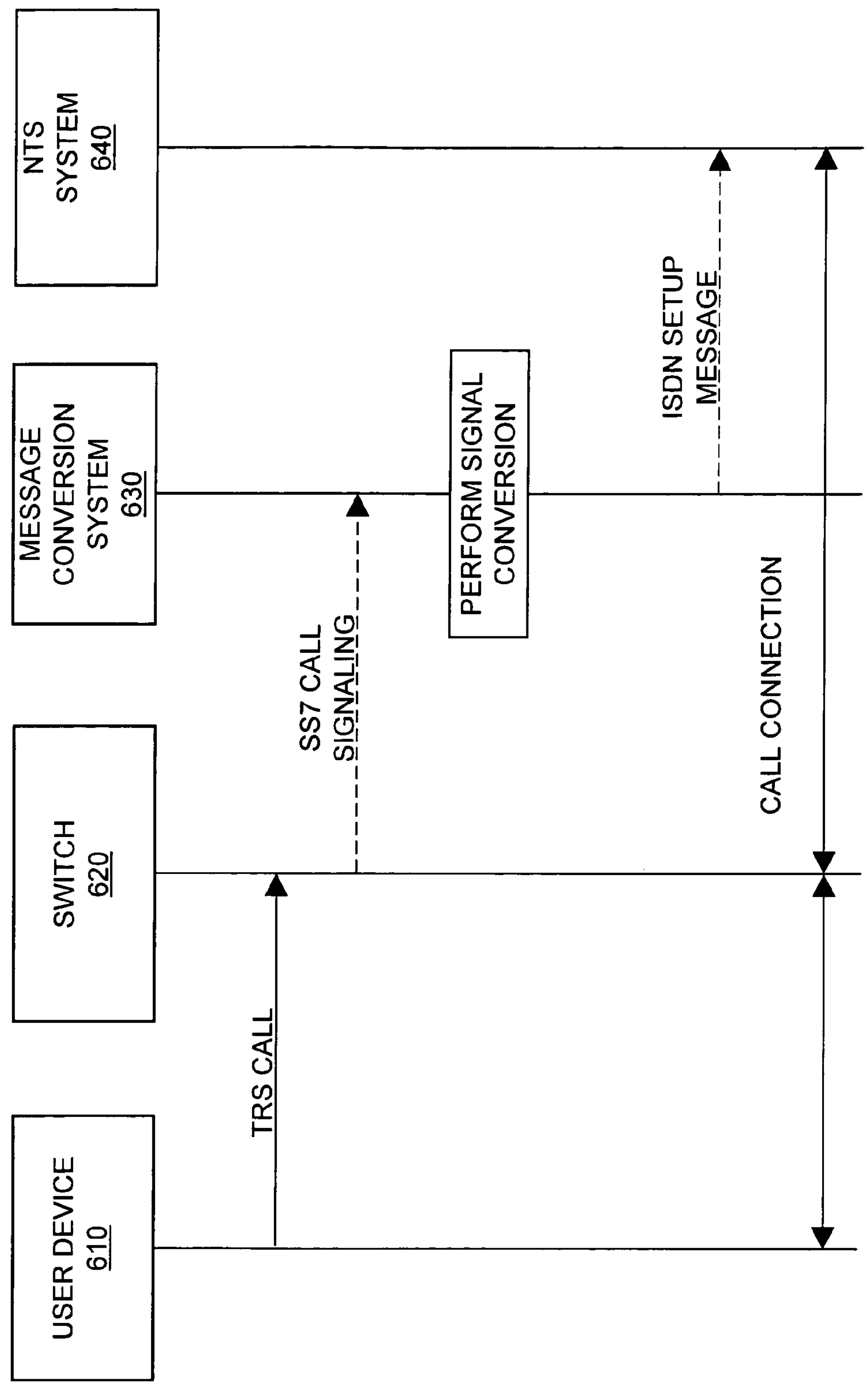
FIG. 7 illustrates the operation of a TRS system in an embodiment of the invention.

FIG. 7 illustrates operation of TRS system 600 in an embodiment of the invention. A caller desires to places a call to TRS system 600 and dials an 800 number utilizing user device 610. User device 610 could comprise a conventional telephone, a cell phone, personal digital assistant (PDA) or any other type of calling device. User device 610 could also be Baudot or TDD/TTY enabled. User device 610 transmits the dialed number to switch 620. Other intermediary devices could be located between user device 610 and switch 620, such as a cell tower or public branch exchange (PBX) but are not depicted for purposes of simplicity.

The dialed 800 number arrives at switch 620. Switch 620 accesses SCP 670 through STP 660 to determine routing instructions for the call. In accordance with the routing instructions, switch 620 routes the call to NTS system 640. Switch 620 passes SS7 signaling for the call to message conversion system 630 wherein the SS7 signaling includes several call information elements. Message conversion system 630 receives the SS7 signaling and performs signaling conversion to the SS7 signaling. Message conversion system 630 then transfers an ISDN setup message to NTS system 640 wherein the ISDN setup message contains the call information elements from the SS7 signaling.

Figure 8:
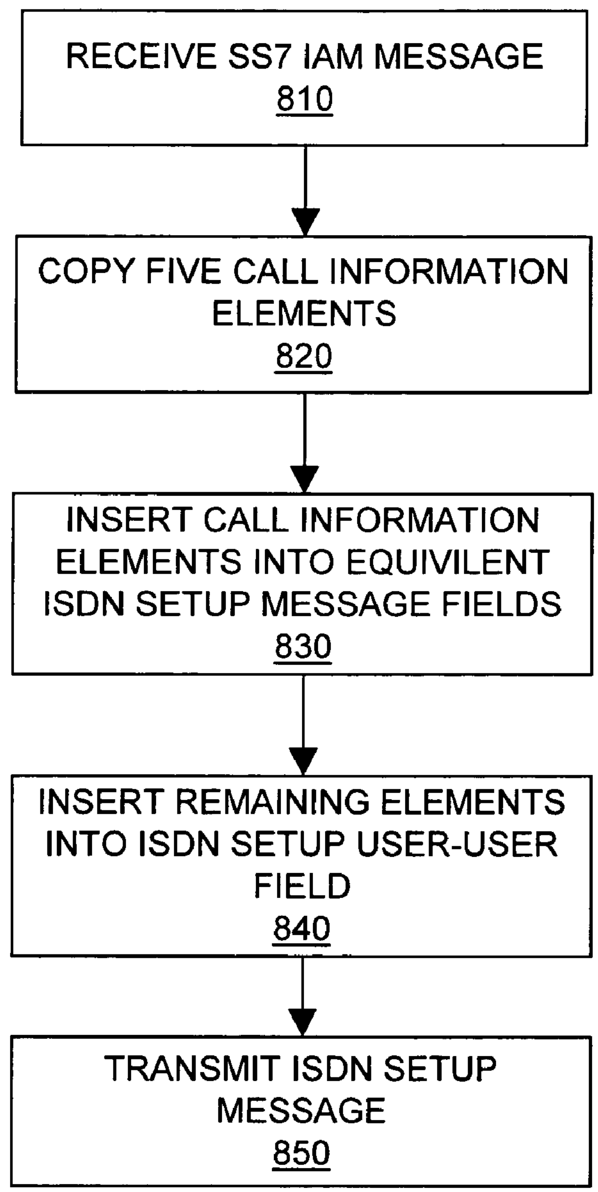
FIG. 8 illustrates the operation of a message conversion system in an embodiment of the invention.

FIG. 8 illustrates the operation of message conversion system 630 in an embodiment of the invention. Message conversion system 630 receives an SS7 Initial Address Message (IAM) from switch 620 (Step 810). The IAM includes five elements: the calling party number, called party number, originating line information (OLI), privacy byte element, and charge number. Message conversion system 630 copies the five elements (Step 820) and inserts the calling party number and called party number into equivalent fields in an ISDN setup message (Step 830). Message conversion system 630 inserts the remaining three elements (OLI, privacy byte, and charge number) into the User—User field of the ISDN setup message (Step 840). Message conversion system 630 then transmits the ISDN setup message to NTS system 640. When the ISDN setup message arrives at NTS system 640, the ISDN setup message is parsed and the five call information elements extracted by a T-1 interface card and passed on for call processing (Step 850).

FIG. 9 illustrates the format of the User—User information element in an embodiment of the invention. In this embodiment, ANSI SS7 to ANSI ISDN conversion allows for the Called Party Number and the Calling Party Number from the IAM on the ISUP side to pass through to the ISDN Setup message. In order to allow the other fields to be mapped onto the User—User information element a specific number of bytes for each element must be set aside in the User—User information element. The third byte will have the Privacy bit in the least significant bit (LSB). The other bits are set to 0s. Bytes 4 to 19 will have the charge party number digits in ASCII format. Only the digits will be in ASCII format. The rest of the bytes will be non-ASCII 0s. The 20th byte will contain the OLI information. If the ANSI ISUP IAM has the user-to-user information parameter, the contents of that parameter will be appended to the end of the user—user element i.e., bytes 21 to n (where n is the sum of 20 and the number of bytes in the user-to-user information in the IAM).

In the Encore SP230, the above user—user information format is user configurable. In order to have the user—user information element with the above information the following command is entered into the SP230 via the maintenance interface.

user>config cc useruserinfo

Do you want to add the user—user element with information from the calling party number, charge number and original called number (y/n, current=n): y user>

By default the value is set to ‘n’ for no. The value will have to changed to ‘y’.

The ISUP (ISDN User Part) IAM (Initial Address Message) contains three sections, the Mandatory Fixed Part, the Mandatory Variable Part, and the Optional Part. The Fixed Part is used to route a call. The Mandatory Variable Part contains the call information (Called Party Number, Calling Party Number and the Caller-ID Presentation byte, Carrier Identification, and Charge Number). The Optional Part contains the Originating Line Information (a.k.a. Information Digits) and call redirection information. The format of the Calling Party Number includes the Caller-ID Presentation bytes.

FIG. 10 depicts the twelve octets of the Calling Party Number parameter. The same parameter format, minus the Presentation bytes, is also used for the Called Party Number and the Charge (Billing) Number. The Originating Line Information is a single octet located in the Optional Part of the IAM message. The Calling Party Number and Called Party Number have standard locations in the ISDN Setup message. The remaining three, OLI, Privacy Byte and Charge Number will be placed in the ISDN Setup User—User field.

The SS7 data is passed to the NTS system by a Pulse-Encore SP230 Signal Converter that changes the FG-D w/SS7 call to an ISDN call. SS7 is required for Caller-ID blocking, Information Digits used for TRS Alternate Billing detection, Calling Party Number, Called Party Number, and Charge Number to identify the billing number for Cell and PCS phones. The above information is made available within the ISDN Setup message and is accessible to the NTS system via the ISDN D-Channel. Feature Group D with SS7 provides for toll, 800 and 900 calls. Necessary call information is passed via ISDN to the Encore SP230. The voice path connects directly to the LEC access tandem switch. The SS7 path uses existing connectivity between a long distance carrier's SS7 network and the SS7 network of the LECs owning the access tandem switch.

Inbound Call Example

A typical inbound TRS call process in an embodiment of the invention follows. A deaf caller using a Baudot TTY dials an 800 number and the call arrives at a DMS-250. The DMS-250 executes an SCP dip to retrieve routing instructions for the dialed 800 number. The DMS-250 routes the call to a Pulse-Encore SP230 Signal Converter. The converter receives the call via a Feature Group D with SS7 and passes it to an NTS system via an ISDN circuit. Five call information elements are extracted from the SS7 IAM message and inserted into an ISDN Setup message and transmitted to the NTS system.

When an inbound call arrives, the NTS system retrieves the inbound call information from the ISDN D-Channel Setup message. Using the Calling Party Number in the inbound call information, an Intelligent Call Routing Service (ICRS) server running on a remote processor (RP) retrieves the caller's Preferred Routing information including a preferred connection mode such as voice, TTY, or ASCII. The NTS system will connect with ASCII calls at the highest baud rate that can be negotiated. The NTS system will send the caller's inbound call information including Calling Party Number and Called Party Number (if available) information to the Intelligent Call Routing Service (ICRS). A Skills Based Routing Server (SBR-S) will retrieve the caller's Preferred Routing information and the select the most appropriate agent based on the combined information.

The NTS system will instruct a Telephony Server to make a peer-to-peer connection between the inbound call Telephony port and the selected agent position. The inbound call information (Called Party Number, Calling Party Number, Charge Number, OLI, Caller-ID Presentation bit, and Call Arrival time) as well as the ETurboCode Record Information Block (if available) will be sent to the selected agent position. The Agent workstation (JRelay) sees the inbound call and sets up the workstation to receive either a text or VoIP connection to the NTS system as indicated by the information provided by the NTS system. Using the inbound call information JRelay completes the workstation application setup, issues a greeting to the caller, and retrieves the Caller's profile from a Customer Profile Database. The last act of call setup is to create the Call Detail Record (CDR) and populate the basic call fields in the CDR.

Figure 11:
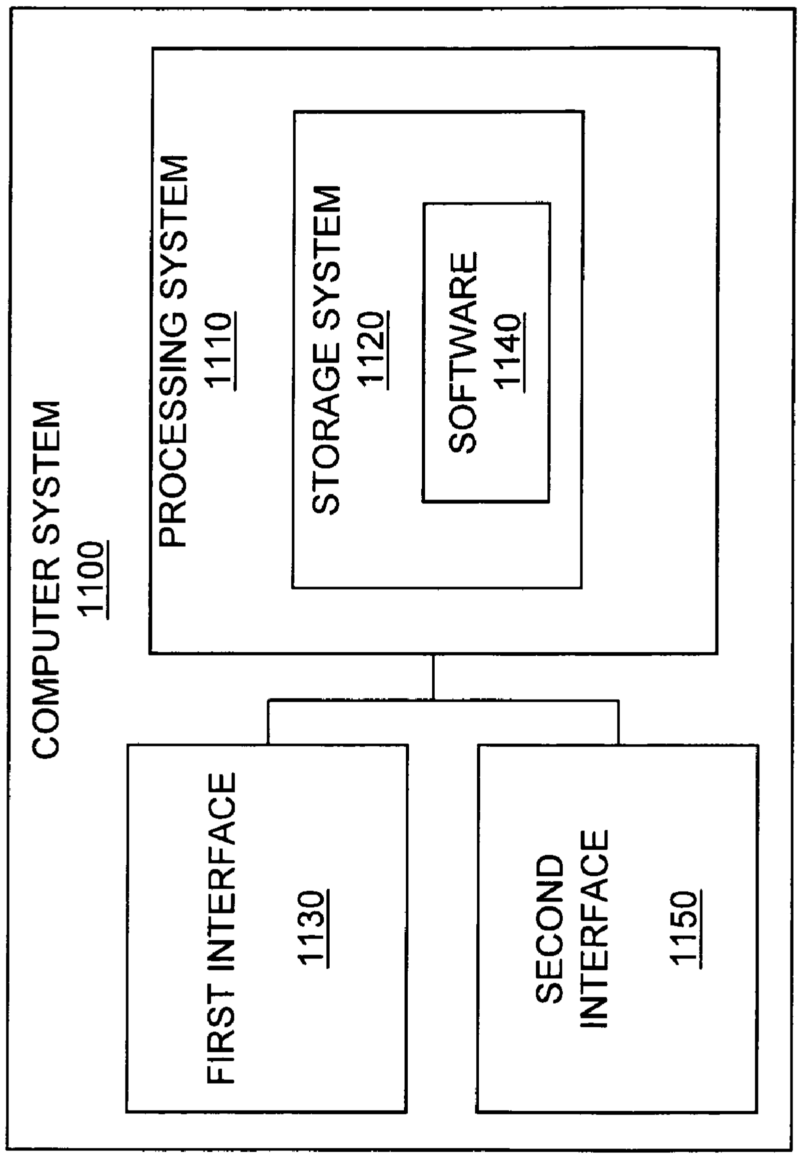
FIG. 11 illustrates a computer system in an embodiment of the invention.

Computer System Configuration—FIG. 11

FIG. 11 illustrates computer system 1100 that could be used to implement aspects of the invention. In particular, computer system 1100 could be used in communication system 120, and in other similar communication systems. Computer system 1100 includes processing system 1110, storage system 1120, software 1140, first interface 1130, and second interface 1150. Storage system 1120 stores software 1140. Processing system 1110 is linked to first interface 1130 and second interface 1150. Computer system 1100 could be comprised of programmed general-purpose computers, although those skilled in the art will appreciate that programmable or special purpose circuitry and equipment may be used. Computer system 1100 may use a client server architecture where operations are distributed among a server system and client devices that together comprise elements 1110–1150.

First interface 1130 could comprise a network interface card, modem, port, or some other communication device. First interface 1130 may be distributed among multiple communication devices. Processing system 1110 could comprise a computer microprocessor, logic circuit, or some other processing device. Processing system 1110 may be distributed among multiple processing devices. Second interface 1150 could comprise a keyboard, mouse, voice recognition interface, microphone and speakers, graphical display, touch screen, or some other type of user device. Storage system 1120 could comprise a disk, tape, integrated circuit, server, or some other memory device. Storage system 1120 may be distributed among multiple memory devices.

Processing system 1110 retrieves and executes software 1140 from storage system 1120. Software 1140 may comprise an operating system, utilities, drivers, networking software, and other software typically loaded onto a general-purpose computer. Software 940 could also comprise an application program, firmware, or some other form of machine-readable processing instructions. When executed by the processing system 1110, software 1140 directs the processing system 1110 to operate as described for communication system 120.

What is claimed is:

1. A method of operating a communication system for telecommunication relay services, the method comprising:

receiving first call signaling for an incoming call from a calling party wherein the first call signaling indicates first information for the incoming call;

processing the first call signaling to determine the agent for the incoming call;

connecting the incoming call from the calling party to an agent;

transferring second call signaling for an outgoing call to a called party wherein the second call signaling indicates the first information for the incoming call;

connecting the outgoing call from the agent to the called party; and translating communications between the calling party and the called party from a first type to a second type.

2. The method of claim 1 wherein the first information for the incoming call includes a calling party number.

3. The method of claim 2 further comprising processing the calling party number to determine the agent for the incoming call.

4. The method of claim 1 wherein the first call signaling indicates second information for the incoming call.

5. The method of claim 4 wherein the second information includes a dialed number.

6. The method of claim 4 further comprising processing the first information to determine a first answer type for the incoming call.

7. The method of claim 6 wherein the first answer type comprises voice.

8. The method of claim 6 wherein the first answer type comprises Baudot.

9. The method of claim 6 wherein the first answer type comprises text mode.

10. The method of claim 6 wherein the first answer type comprises video relay.

11. The method of claim 6 further comprising processing the second information to determine a second answer type for the incoming call.

12. The method of claim 11 comprising answering the incoming call using the second answer type in response to a determination that the first answer type does not exist.

13. The method of claim 11 comprising answering the incoming call using the first answer type if the first answer type differs from the second answer type.

14. The method of claim 11 comprising answering the incoming call using the first answer type if the second answer type is the same as the first answer type.

15. The method of claim 1 wherein the first call signaling comprises signaling system seven (SS7) signaling.

16. The method of claim 1 wherein the first type comprises text communications and the second type comprises speech communications.

17. The method of claim 1 wherein the first type comprises sign language communications and the second type comprises speech communications.

18. A communication system comprising:

a first interface configured to receive first call signaling for an incoming call from a calling party wherein the first call signaling indicates first information for the incoming call and receive a first type of communications for the incoming call from the calling party and transfer the communications to an agent;

a processing system configured to process the first call signaling to determine the agent for the incoming call; and a second interface configured to transfer second call signaling for an outgoing call to a called party wherein the second call signaling indicates the first information for the incoming call and transfer a second type of communications for the outgoing call from the agent to the called party wherein the agent translated the first type of communications to the second type of communications.

19. The communication system of claim 18 wherein the first information for the incoming call includes a calling party number.

20. The communication system of claim 18 wherein the processing system is configured to process the calling party number to determine the agent for the incoming call.

21. The communication system of claim 18 wherein the first call signaling indicates second information for the incoming call.

22. The communication system of claim 21 wherein the second information includes a dialed number.

23. The communication system of claim 21 wherein the processing system is further configured to process the first information to determine a first answer type for the incoming call.

24. The communication system of claim 23 wherein the first answer type comprises voice.

25. The communication system of claim 23 wherein the first answer type comprises Baudot.

26. The communication system of claim 23 wherein the first answer type comprises text mode.

27. The communication system of claim 23 wherein the first answer type comprises video relay.

28. The communication system of claim 23 wherein the processing system is further configured to process the second information to determine a second answer type for the incoming call.

29. The communication system of claim 28 wherein the processing system instructs the agent to answer the incoming call using the second answer type in response to a determination that the first answer type does not exist.

30. The communication system of claim 28 wherein the processing system instructs the agent to answer the incoming call using the first answer type if the first answer type differs from the second answer type.

31. The communication system of claim 28 wherein the processing system instructs the agent to answer the incoming call using the first answer type if the second answer type is the same as the first answer type.

32. The communication system of claim 18 wherein the first call signaling comprises signaling system seven (SS7) signaling.

33. The communication system of claim 18 wherein the first type comprises text communications and the second type comprises speech communications.

34. The communication system of claim 18 wherein the first type comprises sign language communications and the second type comprises speech communications.

* * * * *